US010079829B2

United States Patent
Angus

(10) Patent No.: US 10,079,829 B2
(45) Date of Patent: Sep. 18, 2018

(54) SECURE PROVISIONING OF DEVICES FOR MANUFACTURING AND MAINTENANCE

(71) Applicant: The Boeing Company, Chicago, IL (US)

(72) Inventor: Ian G. Angus, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 489 days.

(21) Appl. No.: 14/677,446

(22) Filed: Apr. 2, 2015

(65) Prior Publication Data

US 2016/0294829 A1 Oct. 6, 2016

(51) Int. Cl.
*H04L 29/06* (2006.01)
*H04L 9/32* (2006.01)
(Continued)

(52) U.S. Cl.
CPC .......... *H04L 63/0876* (2013.01); *H04L 9/085* (2013.01); *H04L 9/3247* (2013.01); *H04L 9/3268* (2013.01); *H04L 63/0428* (2013.01); *H04L 63/18* (2013.01); *H04W 4/38* (2018.02); *H04W 4/50* (2018.02); *H04W 12/02* (2013.01);
(Continued)

(58) Field of Classification Search
CPC . H04L 63/0876; H04L 9/3268; H04L 9/3247; H04L 63/0428; H04L 63/18; H04W 12/08; H04W 4/001; H04W 4/006; H04W 12/02; H04W 12/06
See application file for complete search history.

(56) References Cited

U.S. PATENT DOCUMENTS 7,275,156 B2 * 9/2007 Balfanz ............... H04L 12/1818
  713/168
2003/0217283 A1 * 11/2003 Hrastar ............... H04L 63/1416
  726/11

(Continued)

OTHER PUBLICATIONS

Rekhis, Slim; Boudriga, Noureddine. Pattern-based digital investigation of x-hole attacks in wireless adhoc and sensor networks. International Conference on Ultra Modern Telecommunications &Workshops, 2009. ICUMT '09. Pub. Date: 2009. https://ieeexplore.ieee.org/stamp/stamp.jsp?tp=&arnumber=5345388.*

(Continued)

*Primary Examiner* — Jeremiah Avery
(74) *Attorney, Agent, or Firm* — Kunzler, PC

(57) ABSTRACT

Described herein are methods, apparatuses, and systems for secure provisioning of devices for manufacturing and maintenance. A method includes provisioning a sensor device by storing identification data for the sensor device and information used to authenticate the identification data in the sensor device. A method includes storing subassembly data for the sensor device and information used to authenticate the subassembly data in the sensor device in response to the sensor device being received and installed in a subassembly unit. The sensor device is installed in response to validating authenticity of the identification data. A method includes connecting the sensor device to a wireless sensor network in response to validating authenticity of one or more of the identification data and the subassembly data. The sensor device is integrated into a larger unit comprising the wireless sensor network.

13 Claims, 10 Drawing Sheets

(51) Int. Cl.
*H04W 12/06* (2009.01)
*H04L 9/08* (2006.01)
*H04W 12/02* (2009.01)
*H04W 12/08* (2009.01)
*H04W 4/50* (2018.01)
*H04W 4/38* (2018.01)

(52) U.S. Cl.
CPC ........... *H04W 12/06* (2013.01); *H04W 12/08* (2013.01); *H04L 2209/805* (2013.01)

(56) References Cited

U.S. PATENT DOCUMENTS

| | | | | |
|---|---|---|---|---|
| 2004/0098610 | A1* | 5/2004 | Hrastar | H04L 41/0893 726/1 |
| 2005/0144437 | A1* | 6/2005 | Ransom | G06F 1/28 713/151 |
| 2012/0323717 | A1* | 12/2012 | Kirsch | G06Q 20/0855 705/26.1 |
| 2013/0094538 | A1* | 4/2013 | Wang | H04B 1/707 375/141 |
| 2013/0145482 | A1* | 6/2013 | Ricci | H04W 4/90 726/28 |
| 2014/0167928 | A1* | 6/2014 | Burd | H04L 12/2803 340/12.5 |
| 2014/0181892 | A1* | 6/2014 | Von Bokern | H04L 63/102 726/1 |
| 2014/0189792 | A1* | 7/2014 | Lesavich | G06F 17/30864 726/3 |
| 2014/0229735 | A1 | 8/2014 | Holleis | |
| 2014/0337633 | A1* | 11/2014 | Yang | H04W 12/08 713/178 |

OTHER PUBLICATIONS

Janies, Jeff; Huang, Chin-Tser; Johnson, Nathan L. SUMP: A Secure Unicast Messaging Protocol for Wireless Ad Hoc Sensor Networks. IEEE International Conference on Communications, 2006. ICC '06. Pub. Date: 2006. https://ieeexplore.ieee.org/stamp/stamp.jsp?tp=&arnumber=4025042.*

Ploz, S.; Farshad, A.; Tauber, M.; Lesjak< C.; Ruprechter, T.; Pereira, N. Security Vulnerabilities and Risks in Industrial Usage of Wireless Communication. 2014 IEEE Emerging Technology and Factory Automation (ETFA). Pub. Date: 2014. https://ieeexplore.ieee.org/stamp/stamp.jsp?tp=&arnumber=7005129.*

* cited by examiner

SECURE PROVISIONING OF DEVICES FOR MANUFACTURING AND MAINTENANCE

FIELD

This disclosure relates to manufacturing, and more particularly to securely provisioning devices in the manufacturing process.

BACKGROUND

Wireless sensor networks can be used in vehicles and other structures to monitor, manage, and provide data regarding the health or status of the vehicle or structure. Wireless sensor networks can be integrated into existing networks on the vehicle or structure; however, this can expose a means for an attacker to gain unauthorized access to the network. With this in mind, it may be important to securely provision wireless sensor networks, and the devices used in the wireless sensor networks, to ensure only authorized devices can join the wireless sensor networks. Accordingly, it may be necessary to securely provision and maintain the devices in the wireless sensor network during the manufacturing process, throughout the supply chain, and during ongoing repairs and maintenance, to ensure the wireless sensor network remains secure.

SUMMARY

The subject matter of the present application has been developed in response to the present state of the art, and in particular, in response to the problems and needs of securely establishing and maintaining wireless sensor networks that have not yet been fully solved by currently available systems. For example, conventional methods for joining a wireless sensor network may involve sending identification information for devices, such as sensors, in the clear over an unsecure network where the information may be misappropriated, which may allow an unauthorized device to join the wireless sensor network and compromise the security of the network. In general, the subject matter of the present application has been developed to provide an apparatus, method, computer program product and system for securely provisioning devices for wireless sensor networks during manufacturing and maintenance that overcomes at least some of the above-discussed shortcomings of the prior art.

According to one embodiment, an apparatus for secure provisioning of device during manufacturing and maintenance includes an identification module configured to receive identification data associated with a sensor device from a network maintenance device. The network maintenance device sends the identification data over a first network. In a further embodiment, the apparatus includes an encryption module configured to encrypt a message using at least a portion of the received identification data. The apparatus, in some embodiments, includes a transmission module configured to send the encrypted message to the sensor device over a second network. The apparatus further includes a connection module configured to connect the sensor device to the second network in response to receiving an encrypted message from the sensor device over the second network. The encrypted message verifies the identity of the sensor device.

In an implementation of the apparatus, the apparatus includes a validation module configured to authenticate data stored on the sensor device by verifying a digital signature of one or more of a manufacturer of the sensor device and a supplier of the sensor device. In another implementation, the network maintenance device receives the identification data associated with the sensor device in response to reading a quick response (QR) code comprising the identification information. In some instances, the network maintenance device receives the identification data associated with the sensor device in response to reading a radio-frequency identifier (RFID) tag. In a further embodiment, the second network comprises a wireless sensor network (WSN), the WSN comprising a plurality of sensor devices.

In one implementation of the apparatus, the identification data comprises a media access control (MAC) address and one or more of a public key and a random number. In a further embodiment, the sensor device connects to the second network using a wireless networking protocol. In yet another embodiment, the encryption module encrypts the message by performing an exclusive-or (XOR) operation on the message and the at least a portion of the identification data. In certain embodiments, the message comprises a random advanced encryption standard (AES) key. The transmission module, in some embodiments, sends the encrypted message to a sensor device identified by a MAC address included in the identification data. In one instance, the apparatus includes a device module configured to maintain a table of allowable sensor devices of the second network. A MAC address for the sensor device is added to the table of allowable sensor devices in response to the connection module receiving the encrypted message from the sensor device.

A method for secure provisioning of device during manufacturing and maintenance, in one embodiment, includes receiving identification data associated with a sensor device from a network maintenance device. In some embodiments, the network maintenance device sends the identification data over a first network. The method, in a further implementation includes encrypting a message using at least a portion of the received identification data. In certain embodiments, the method includes sending the encrypted message to the sensor device over a second network. In yet another embodiment, the method includes connecting the sensor device to the second network in response to receiving an encrypted message from the sensor device over the second network. The encrypted message may verify the identity of the sensor device.

In a further implementation, the method includes authenticating data stored on the sensor device by verifying a digital signature of one or more of a manufacturer of the sensor device and a supplier of the sensor device. In one embodiment, the network maintenance device receives the identification data associated with the sensor device in response to reading a quick response (QR) code comprising the identification data. In yet another embodiment, the network maintenance device receives the identification data associated with the sensor device in response to reading a radio-frequency identifier (RFID) tag.

In various embodiments, the second network comprises a wireless sensor network (WSN), the WSN comprising a plurality of sensor devices. In some embodiments, the identification data comprises a media access control (MAC) address and one or more of a public key and a random number. In certain embodiments, the sensor device connects to the second network using a wireless networking protocol. In a further embodiment, encrypting the message further includes performing an exclusive-or (XOR) operation on the message and the at least a portion of the identification data. In one implementation, the message comprises a random advanced encryption standard (AES) key.

In various embodiments, the method includes sending the encrypted message to a sensor device identified by a MAC address included in the identification data. In a further embodiment, the method includes maintaining a table of allowable sensor devices of the second network, wherein a MAC address for the sensor device is added to the table of allowable sensor devices in response to receiving the encrypted message from the sensor device.

A method for secure provisioning of device during manufacturing and maintenance, in one embodiment, includes provisioning a sensor device by storing identification data associated with the sensor device and information used to authenticate the identification data in the sensor device. In a further embodiment, the method includes storing subassembly data associated with the sensor device and information used to authenticate the subassembly data in the sensor device in response to the sensor device being received and installed in a subassembly unit. In one implementation, the sensor device is installed in response to validating authenticity of the identification data. The method further includes connecting the sensor device to a wireless sensor network in response to validating authenticity of one or more of the identification data and the subassembly data. In one instance, the sensor device is integrated into a larger unit that comprises the wireless sensor network.

In one embodiment, the identification data associated with the sensor device comprises a media access control (MAC) address and one or more of a public key and a random number. In some embodiments, the subassembly data associated with the sensor device comprises one or more of an installation location of the sensor device on the subassembly unit and a serial number for the subassembly unit. In yet another embodiment, validating authenticity of the identification data comprises verifying a digital signature of a manufacturer of the sensor device. In one instance of the method, validating authenticity of the subassembly data comprises verifying a digital signature of a supplier of the subassembly unit.

In one implementation, the method includes storing the identification data and the subassembly data associated with the sensor device on a plurality of access points of the wireless sensor network. In a further embodiment, the method includes sending final production data to the sensor device using an extensible authentication protocol (EAP), the EAP comprising a tunneled posture transport for EAP. In yet another embodiment, the method includes receiving the identification data associated with the sensor device from one or more of a quick-response (QR) code and a radio-frequency identifier (RFID) tag.

An apparatus for secure provisioning of device during manufacturing and maintenance, in one embodiment, includes an initialization module configured to provision a sensor device by storing identification data associated with the sensor device and information used to authenticate the identification data in the sensor device. In a further embodiment, the apparatus includes a supplier module configured to store subassembly data associated with the sensor device and information used to authenticate the subassembly data in the sensor device in response to the sensor device being received and installed in a subassembly unit. In one implementation, the sensor device is installed in response to validating authenticity of the identification data. The apparatus, in various embodiments, includes a connection module configured to connect the sensor device to a wireless sensor network in response to validating authenticity of one or more of the identification data and the subassembly data. In one instance, the sensor device is integrated into a larger unit that comprises the wireless sensor network.

In one embodiment, the identification data associated with the sensor device comprises a media access control (MAC) address and one or more of a public key and a random number. In some embodiments, the subassembly data associated with the sensor device comprises one or more of an installation location of the sensor device on the subassembly unit and a serial number for the subassembly unit. In yet another embodiment, validating authenticity of the identification data comprises verifying a digital signature of a manufacturer of the sensor device. In one instance of the apparatus, validating authenticity of the subassembly data comprises verifying a digital signature of a supplier of the subassembly unit.

In one implementation, the apparatus includes a data module configured to store the identification data and the subassembly data associated with the sensor device on a plurality of access points of the wireless sensor network. In a further embodiment, the apparatus includes a data module configured to send final production data to the sensor device using an extensible authentication protocol (EAP), the EAP comprising a tunneled posture transport for EAP. In yet another embodiment, the apparatus includes a data module configured to receive the identification data associated with the sensor device from one or more of a quick-response (QR) code and a radio-frequency identifier (RFID) tag.

Another method for secure provisioning of device during manufacturing and maintenance includes detecting a change in one or more devices of a secure wireless sensor network. In one instance, the change in the one or more devices breaks a chain of trust between the devices of the secure wireless signal network. In a further embodiment, the method includes receiving data from one or more unchanged devices of the secure wireless sensor network. In some implementations the data comprises information for reconstructing the chain of trust between the devices of the secure wireless sensor network. In certain embodiments, the method includes reconstructing the chain of trust of the secure wireless sensor network in response to receiving the data.

In some implementations, the change in the one or more devices comprises replacing an existing certificate authority (CA) server with a new CA server, the new CA server configured to maintain the chain of trust between the devices of the secure wireless sensor network. In yet another implementation, in response to the existing CA server being replaced, one or more unchanged devices of the secure wireless sensor network authenticate to the new CA server using a certificate issued by an owner of the CA server. In some embodiments, the one or more unchanged devices authenticate to the new CA server by verifying that a tail number of the certificate for the new CA server matches a tail number of a certificate for the old CA server.

In one implementation, the owner of the CA server is an airline and the secure wireless sensor network comprises a secure wireless sensor network for an airplane. In another embodiment, the new CA server reissues certificates to the one or more unchanged devices of the secure wireless sensor network in response to verifying the identities of the one or more unchanged devices. In a further embodiment, the data for reconstructing the chain of trust is stored on one or more access points of the secure wireless sensor network using a secret sharing algorithm. In one instance, the secret sharing algorithm comprises a Shamir's Secret Sharing algorithm.

A system for secure provisioning of device during manufacturing and maintenance, in one embodiment, includes a plurality of sensor devices produced by one or more first entities. In another embodiment, the system includes a provisioning module configured to associate identification and authentication data with the sensor devices. In a further embodiment, the system includes a validation module configured to identify and authenticate the sensor devices by verifying a digital signature of the one or more first entities. In some implementations, the system includes a plurality of subassembly units produced by one or more second entities and configured to be integrated into a larger assembly unit. In one embodiment, the plurality of sensor devices are integrated into the subassembly units in response to the validation module verifying the sensor devices. In one instance, the provisioning module authenticates and associates subassembly data with the one or more sensor devices.

In a further embodiment, the system includes a larger assembly unit comprising the plurality of subassembly units. In one instance, the plurality of sensor devices are connected to a secure wireless sensor network in response to the validation module verifying an identity and authenticity of the sensor devices by verifying a digital signature of one or more of the manufacturer and the supplier. In one embodiment, the system includes a repair module configured to reconstruct a chain of trust between the sensor devices and one or more other devices of the secure wireless sensor network in response to a device of the secure wireless sensor network being replaced.

In a further embodiment, the system includes a quick response (QR) code reader configured to read the identification data associated with a sensor from a QR code for the sensor. In one embodiment, the QR reader sends the identification data on a network different than the secure wireless sensor network. In another embodiment, the system includes a radio-frequency identifier (RFID) reader configured to read the identification data associated with a sensor from an RFID tag for the sensor. In one instance, the RFID reader sends the identification data on a network different than the secure wireless sensor network.

In a further implementation, the identification data comprises a media access control (MAC) address and one of a public key and a random number, and the subassembly data comprises a location of the sensor on the subassembly unit. In one embodiment, the one or more first entities comprise one or more manufacturers of the sensor devices and the one or more second entities comprise one or more suppliers of the subassembly units. In certain embodiments, the larger assembly unit comprises a final product. In one instance, the final product comprises a vehicle and the subassembly units comprise different portions of the vehicle.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
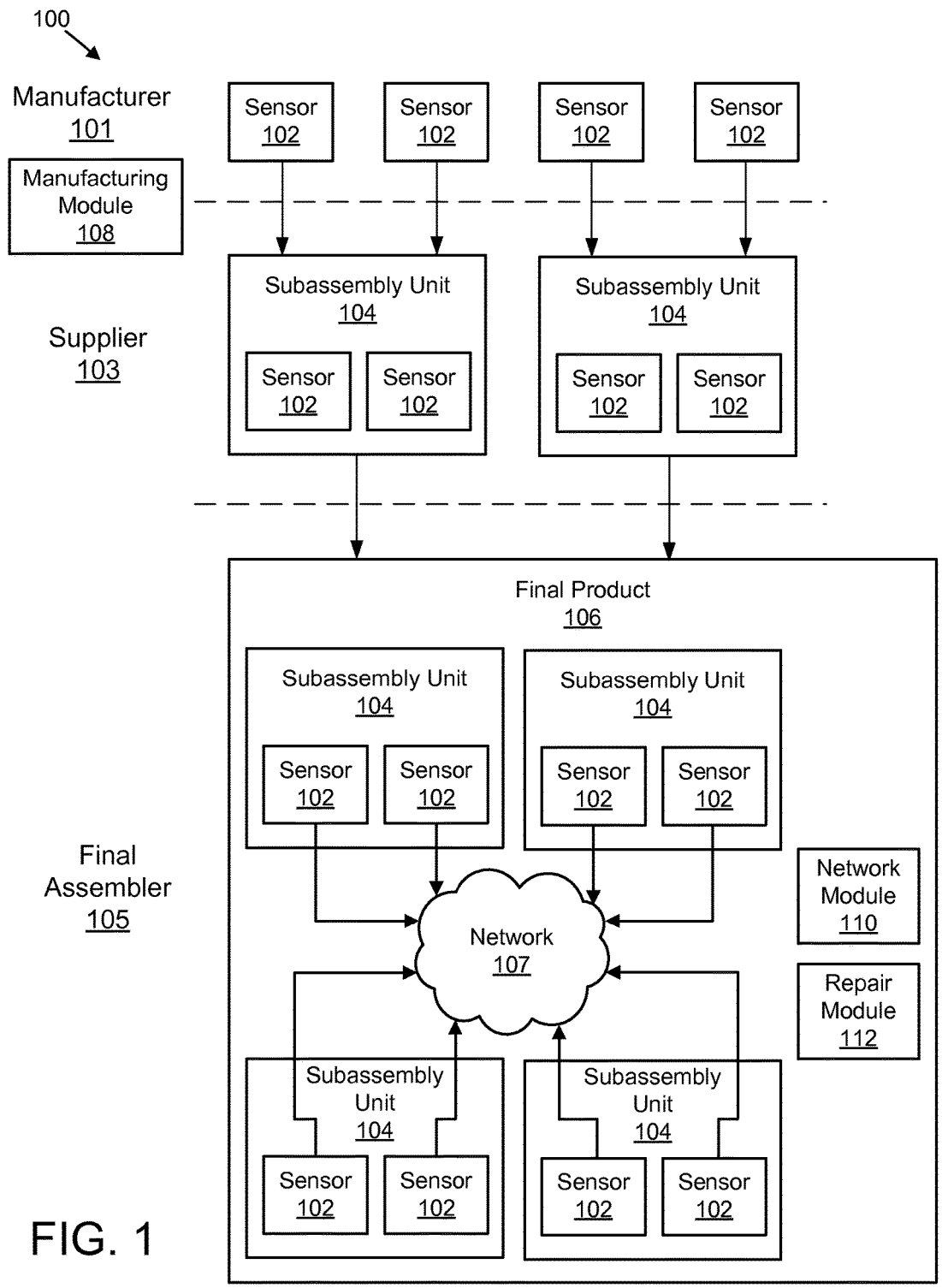
FIG. 1 is a schematic block diagram illustrating one embodiment of a system for secure provisioning of devices for manufacturing and maintenance.

FIG. 1 depicts one embodiment of a system 100 for secure provisioning of devices for manufacturing and maintenance. In one embodiment, the system 100 depicts a manufacturing and assembly process, such as a supply chain or assembly line, for a product. The product may include different mobile structures or vehicles, such as aircraft, automobiles, trains, spacecraft, watercraft, and the like. The product, in another embodiment, may include non-mobile structures, such as bridges, buildings, or other complex structures.

In the depicted embodiment, the system 100 includes three entities: a first entity, which may include the manufacturer 101 that creates parts (e.g., sensors 102 or motes described below); a second entity, which may include the supplier 103 that integrates the parts produced by the manufacturer into different subassembly units 104; and a third entity, which may include the final assembler 105 that integrates the subassembly units 104 into a final, finished product 106. The manufacturing system 100 disclosed herein may be implemented for manufacturing a variety of products made from various components, pieces, and parts from different part manufacturers, suppliers, vendors, assemblers, or the like.

Also, in some embodiments, what is generally considered a single entity may be considered two or more entities if the entity brings components, pieces or parts from different places to put together into a larger piece. Embodiments provide an ability to verify parts, pieces and components brought together to assemble into a larger piece. An entity generally (1) produces various components, pieces or parts, or (2) may find use in verifying parts, pieces or components that it assembles into a larger piece or both (1) and (2). As an example, a hard disk drive manufacturing company may be considered three entities. A first entity is the factory of the manufacturing company that produces heads. A second entity is the factory of the manufacturing company that produces disks. A third entity is the factory of the manufacturing company that receives the heads and disks from the other factories and assembles them into finished hard disk drives.

Even though the depicted system 100 is illustrated as having a particular number of elements 101-112, the system 100 may include any number of elements 101-112. For example, the system 100 may include a plurality of manufacturers 101 that produce different parts, a plurality of suppliers 103 that produce different subassembly units 104 that are used in the final product 106, etc. In one embodiment, the system 100 includes a plurality of sensors 102 produced by manufacturers 101, a plurality of subassembly units 104 that include the sensors 102 produced by the manufacturers 101, and a larger assembly unit/final product 106 that includes the subassembly units 104 and the sensors 102. In one embodiment, the final product 106 also includes a data network 107 that the plurality of sensors 102 use for data communications. The system 100 also includes a manufacturing module 108, a network module 110, and a repair module 112, which are described in more detail below.

In one embodiment, the sensors 102 are configured to detect events or changes in quantities and provide a corresponding output, generally as an electrical or optical signal. For example, the sensors 102 may include sensors to detect light, motion, temperature, magnetic fields, gravity, humidity, moisture, vibration, pressure, electrical fields, sound, and other physical aspects of an external environment.

In one embodiment, the sensors 102 comprise low-power devices that include a network interface to connect the sensor 102 to a wireless or wired data network 107. For example, the data network 107 may comprise a wireless sensor network (WSN). As used herein, a WSN comprises a network of spatially distributed autonomous sensors 102 to monitor physical or environmental conditions, and to cooperatively pass their data through the network to a main location, such as a central server. In such an embodiment, the sensors 102 may comprise motes or nodes of the WSN. As used herein, a mote comprises a node in a sensor network that is capable of performing some processing, gathering sensory information, and communicating with other connected nodes or devices in the network 107. The WSN is disclosed in more detail below with reference to FIG. 2.

In some embodiments, the sensors 102 comprise computer readable storage media that store data associated with the initialization or provisioning of the sensor. In certain embodiments, the computer readable storage media is "tamper-proof" such that the storage media cannot be extracted without destroying the sensor 102. In some embodiments, the sensor manufacturer 101 stores initialization data, identification data, or the like, in the computer reader storage media of the sensor 102 after the sensor 102 is produced, which can be used by a supplier 103 or an assembler 105 of the final product 106 as a means to identify the sensors 102. In one embodiment, for example, the manufacturer 101 stores a unique media access controller (MAC) address in the storage media of the sensor, which is used to identify the sensor 102 at later points in the manufacturing process, e.g., at a supplier 103 or a final assembler 105.

In one embodiment, the first entity, e.g., the manufacturer 101 generates unique identification data for the sensors 102 such that suppliers 103 or assemblers 105 at different points in the supply chain can verify the identities of the sensors 102. In one embodiment, if the sensors 102 are to be used in a WSN that utilizes a public key infrastructure (PKI), the manufacturer 101 generates a public/private key pair and stores the private key in a secure storage area of the sensor 102, such as a secure area of the computer readable storage medium or a secure area configured using a trusted platform module (TPM) and a cryptoprocessor. The public key is made externally available by being encoded in a quick-response (QR) code that can be affixed to the sensor 102 or at a place near the sensor 102. Alternatively, or additionally, the public key may be encoded in a radio-frequency identification (RFID) tag. Other means may be used to make the public key externally accessible as is known in the art. In some embodiments, the MAC address for the sensor 102 is also encoded in a QR code or an RFID with the public key.

In some embodiments, the manufacturer 101 may generate a random number instead of generating a public/private key pair in embodiments where the network 107 does not use PKI. In one embodiment, the random number comprises a one-time pad ("PAD"). As used herein, a one-time PAD is an encryption key that is the same size as the data that it will be used to encrypt. Similar to the PKI embodiment above, the manufacturer 101 generates a unique random number for a sensor 102 and stores the number in a secure storage area of the sensor 102. Further, the random number may be encoded in a QR code or an RFID tag so that the random number is externally accessible in order to initiate communications with the sensor 102, as described in more detail below. In some embodiments, the MAC address for the sensor 102 is also encoded in a QR code or an RFID tag with the random number.

In a further embodiment, the manufacturer 101 authenticates the information stored in the sensors 102 (e.g., the MAC address and the public/private key pair or the random number) by digitally signing the data with the manufacturer's digital signature, as is known in the art. Accordingly, the manufacturer's digital certificate associated with its digital signature is also stored on the sensor 102. In this manner, suppliers 103 and final assemblers 105 can verify the authenticity and integrity of the data stored in the sensors 102 and/or the sensor 102 hardware itself.

In one embodiment, one or more second entities, e.g., one or more suppliers 103 receive the sensors 102 from the manufacturer 101 and integrate the received sensors 102 into one or more subassembly units 104. For example, the subassembly units 104 may comprise one or more fuselage parts for an airplane, a plurality of different parts for a car, various portions of a bridge, or the like, that incorporate a plurality of smaller parts/units, such as the sensors 102. In some embodiments, a plurality of different subassembly units 104 are combined to make a larger subassembly unit 104. A sensor 102 may be added or integrated into a previously created subassembly unit 104.

In various embodiments, the suppliers 103 verify the identity of the sensors 102, using the data encoded in the QR code or RFID tag, which may be read and provided by a network maintenance device, and verify the authenticity of the data stored in the sensors 102 by securely connecting to the sensors 102 and checking the digital signature of the manufacturer 101. In some embodiments, the suppliers 103 store additional, supplier-specific, information on the sensors 102, such as where the sensors 102 are located on the subassembly units 104, and signs the data with their digital signatures. The process to add, delete, modify, access, or the like, data stored on the sensors 102 is described in more detail below with reference to the manufacturing module 108. The subassembly units 104 may be forwarded onto one or more additional suppliers 103 before being sent to a final assembler 105.

In a further embodiment, the subassembly units 104 are sent to a third entity, e.g., a final assembler 105 to be installed into a larger assembly unit. In some embodiments, the assembler comprises a final assembler 105 that assembles the subassembly units into a final product 106, such as an airplane, a car, a train, a boat, a bridge, a building, or the like. In some embodiments, the subassembly units 104 may be installed as part of a maintenance operation on an existing product 106. The final assembler 105 combines all the subassembly units 104 into a finished product 106, and connects the sensors 102 to a data network 107, such as a wireless sensor network (WSN). The final assembler 105 verifies the identities of the sensors 102, using the data encoded in the QR code or RFID tag, and verifies the authenticity of the data stored in the sensors 102 by checking the digital signatures of the manufacturer 101 and/or the suppliers 103 of the subassembly units 104. In this manner, the identity of the sensors 102 and the authenticity of the data stored on the sensors 102 can be verified to avoid unauthorized devices from being installed in the final product 106 or accessing the data network 107.

The data network 107, in one embodiment, includes a digital communication network that transmits digital communications. The data network 107 may include a wireless network, such as a wireless cellular network, a local wireless network, such as a Wi-Fi network, a Bluetooth® network, a near-field communication ("NFC") network, an ad hoc network, a wireless sensor network, and/or the like. The data network 107 may include a wide area network ("WAN"), a storage area network ("SAN"), a local area network ("LAN"), an optical fiber network, the internet, or other digital communication network. The data network 107 may include two or more networks. The data network 107 may include one or more servers, routers, switches, access points, and/or other networking equipment. The data network 107 may also include computer readable storage media, such as a hard disk drive, an optical drive, non-volatile memory, random access memory (RAM), or the like.

In one embodiment, the manufacturing module 108 is configured to provision a sensor 102 at a manufacturer 101 by storing identification data and information used to authenticate the identification data associated with the sensor 102. As used herein, provisioning a sensor 102 comprises preparing a sensor 102 for use at later points in the supply chain, which may include storing data in the sensor 102 and/or configuring the sensor 102 for use. In some embodiments, the manufacturing module 108 is further configured to facilitate in sending the sensor 102 to a supplier 103. The supplier 103 installs the sensor 102 into a subassembly unit 104 in response to validating the authenticity of the identification data. In some embodiments, the supplier 103 stores subassembly data and information used to authenticate the subassembly data on the sensor 102. The manufacturing module 108 is further configured to facilitate in sending the subassembly unit 104 to a final production area or final assembler 105 for integration into a larger unit that comprises a plurality of sensors 102. The sensors 102 are connected to a WSN in response to the manufacturing module 108 validating the authenticity of the identification data and/or the subassembly data.

In one embodiment, the networking module 110 is configured to provision and connect a sensor 102 to a WSN by receiving identification data associated with the sensor 102, such as a public key and/or random number encoded in a QR code and/or an RFID tag, and sending the identification data to a server using a previously secured and different network than the WSN, such as a secure Wi-Fi network, a Bluetooth® network, or the like. At least a portion of the identification data is then used to encrypt a message and the encrypted message is sent to the sensor 102 over the data network 107, such as a WSN. In one embodiment, the message comprises a shared secret key that the sensors 102 and the access points (described below) within the WSN use to encrypt messages transmitted on the WSN. The networking module 110 connects the sensor 102 to the WSN in response to receiving an encrypted message from the sensor 102 over the WSN, which verifies the identity of the sensor 102.

In one embodiment, the repair module 112 is configured to detect a change in one or more devices of a WSN. In some embodiments, the change in the devices breaks a chain of trust between the devices of the WSN. The repair module 112, in some embodiments, receives data for reconstructing the chain of trust from one or more unchanged devices of the WSN, and reconstructs the chain of trust of the WSN according to the received data. In this manner, if a securely provisioned device fails, such as a sensor 102, a server, or a certificate authority, a new device can be securely provisioned and connected to the network based on the redundant data that is stored on the other devices of the WSN.

Advantageously, by securely provisioning and maintaining the sensors 102, or other devices, throughout the manufacturing process and supply chain, the risk of integrating unauthorized sensors at any step in the supply chain and at the final product 106 can be reduced. Accordingly, by protecting the integrity and confidentiality of the data stored in the sensors 102 and the data sent across the network 107, the risk of an unauthorized device spoofing a connection to the network 107 or "overhearing" the messages is also reduced. Thus, using the sensors 102 to pass manufacturing data ensures the data is only accessible to authorized systems and is not passed using unauthorized, external systems. In this manner, a supplier 103 or final assembler 105 can verify the identity and authenticity of the sensors 102 being installed and feel confident that the sensor 102 is an authorized and legitimate sensor 102 for the network 107.

Figure 2:
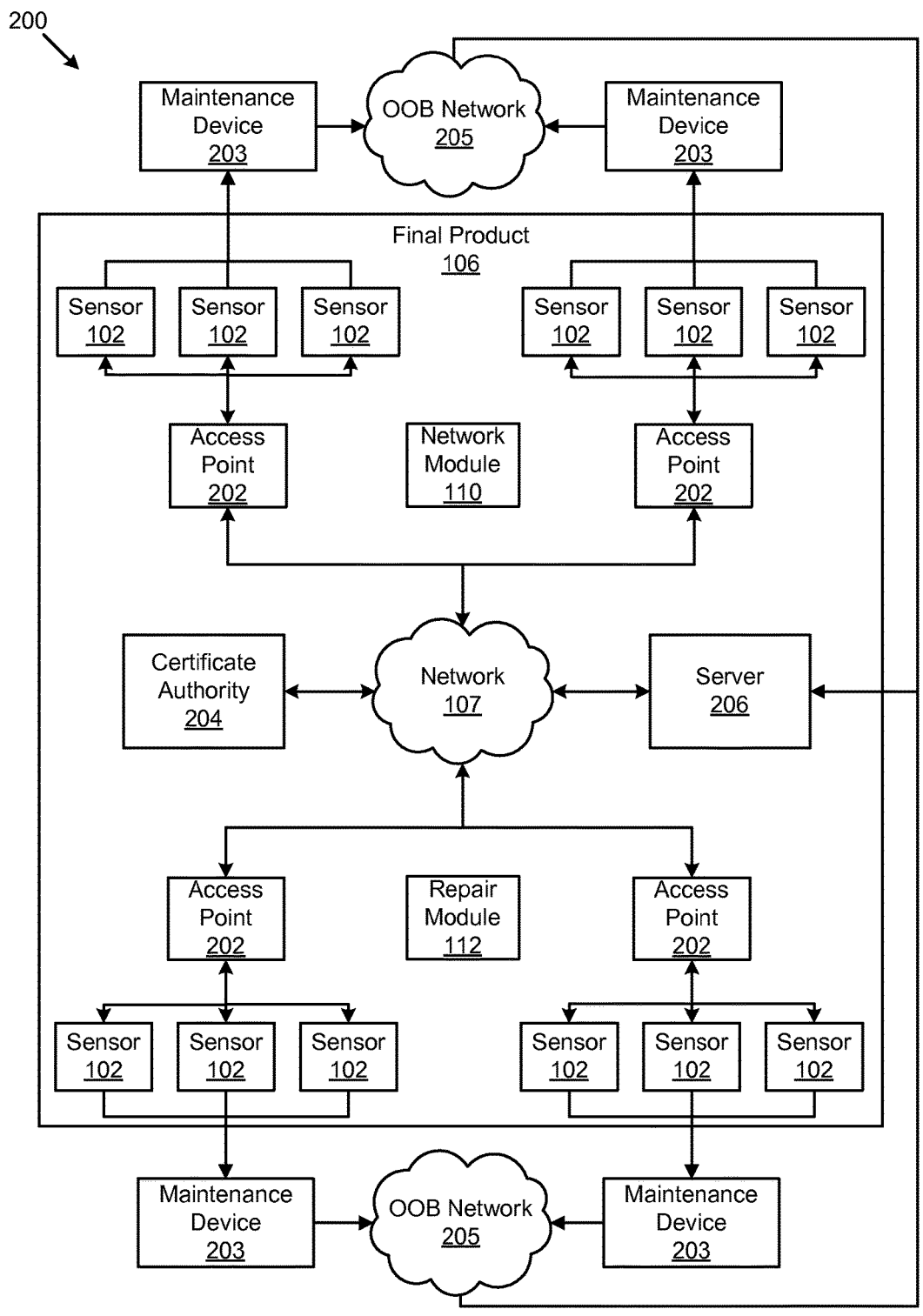
FIG. 2 is a schematic block diagram illustrating one embodiment of a network system for secure provisioning of devices for manufacturing and maintenance.

FIG. 2 is a schematic block diagram illustrating one embodiment of a network 200 for secure provisioning of devices for manufacturing and maintenance. In one embodiment, the network 200 may be installed at a final product 106, such as in an airplane, a car, a ship, a train, a data center, or the like. In certain embodiments, the network 200 includes a plurality of sensors 102, a plurality of access points 202, a server 206, a certificate authority (CA) 204, a network 107, which may include other networking equipment, such as routers, switches, etc., a network module 110, and a repair module 112. Further, the network 200 may also include one or more maintenance devices 203 and one or more out-of-band networks 205.

In one embodiment, the network 200 may be configured as a wireless sensor network (WSN) that includes a plurality of nodes or motes, such as the wireless sensors 102. The WSN may include any number of sensors 102 from a few to several hundreds or thousands—that are connected to each other and/or one or more access points 202. In some embodiments, the sensors 102 may communicate with an access point 202 using a WSN protocol such as ZigBee® or 6LoWPAN based on the 802.15.4 specification. The access points 202 may be connected to the WSN, in particular, the access points may be connected to the server 206 in the WSN, using a wired connection. The sensors 102 are configured to send their data through the network 107 to a main location, such as the server 206. In some embodiments, the WSN may be configured as a bi-directional WSN such that the sensors 102 can be controlled by another device, such as the server 206. In another embodiment, the WSN is configured as a unidirectional WSN such that the server 206 does not control the sensors 102, but only receives data from the sensors 102.

The sensors 102 may be located at various locations on the final product 106. For example, the final product 106 may comprise an airplane, and the sensors 102 may be placed at different locations along the airplane, such as along the fuselage, the wings, the engines, etc., to gather different data points and send the data to the server 206. In some embodiments, the sensors 102 are connected to access points 202, which may be placed at various locations in the final product 106. The access points 202, in some embodiments, are configured to store information associated with the sensors 102 that are connected to the access points 202, such as identification data, digital certificates, or the like. The identification information stored in the access points 202 can be made available for use at a later time. Accordingly, different software can be installed in a sensor 102 based upon the stored identification information. The access points 202 may be connected to the server 206 and/or the CA 204 using a wired connection, such as a wired IPv4 TLS connection, or a secure wireless connection.

The network 200 may also include a server 206 that manages the devices (e.g., sensors 102, access points 202, and the CA 204) on the network 200. The server 206, for example, may maintain a list of authorized devices, may coordinate the exchange of certificates within the network 200 issued by the CA 204, may monitor for device failures within the network 200, or the like. The CA 204, in some embodiments, is configured to issue digital certificates that certify ownership of the network 200. In this manner, devices within the network 200 can form a chain of trust based on the certificates issued by the CA. For example, the network 200 may be owned by an airline and the CA may issue certificates on behalf of the airline that certifies the airline's public key. In some embodiments, the CA 204 in the final product 106 is subordinate to a parent CA (not shown). For example, a CA on an airplane may be subordinate to a CA maintained by an airline, meaning that the CA on the airplane issues certificates that have a traceable trust relationship to the CA maintained by the airline. In some embodiments, the CA 204 is located on the server 206.

In one embodiment, the network maintenance devices 203 receive data, such as identification data from the sensors 102, or more particularly, from an external mechanism associated with the sensors 102. For example, identification data for a sensor 102 may be encoded in a QR code or an RFID tag and made accessible to the maintenance device 203, which may comprise a secure QR code reader or RFID tag reader. The maintenance device 203 sends the identification data to the server 206 using an out-of-band network 205, such as a secure Wi-Fi network. In this manner, the identification data for a sensor 102 can be accessed and sent to the server 206 in a secure manner, which initiates a verification process with a sensor 102 to determine whether the sensor 102 has been authorized to connect to the WSN, without requiring the sensor 102 to connect to the WSN to send its identification information. This prevents unauthorized sensors 102 from connecting to the WSN and possibly compromising the integrity of the WSN.

Figure 3:
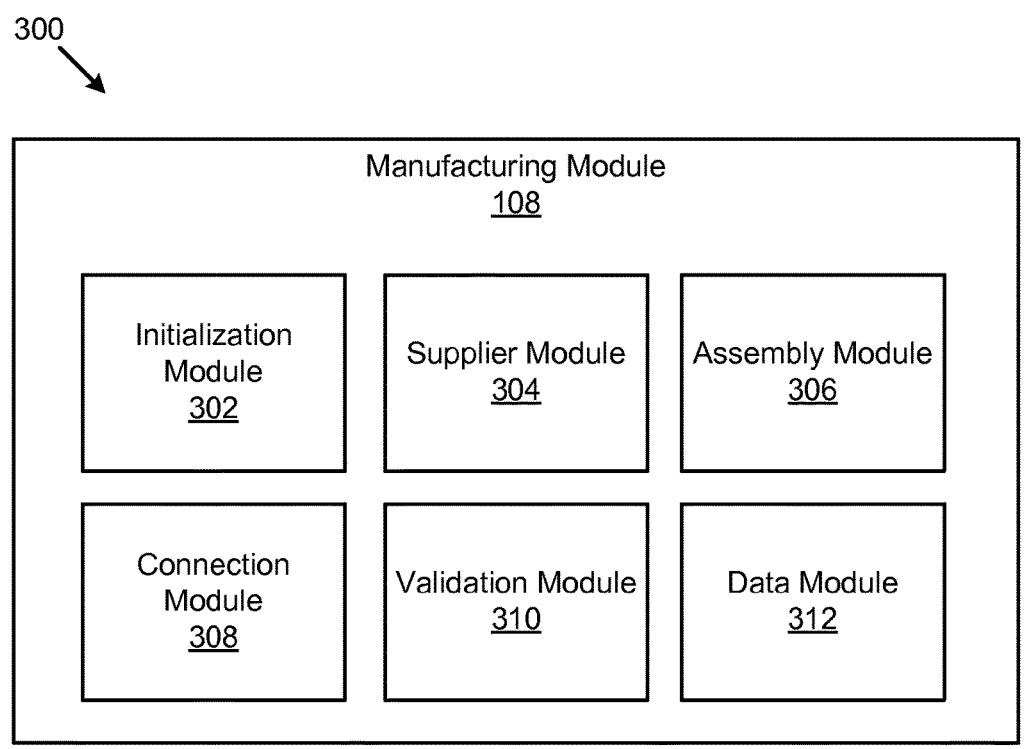
FIG. 3 is a schematic block diagram illustrating one embodiment of a module for secure provisioning of devices for manufacturing and maintenance.

FIG. 3 is a schematic block diagram illustrating one embodiment of a module 300 for secure provisioning of devices for manufacturing and maintenance. In one embodiment, the module 300 includes an embodiment of a manufacturing module 108. The manufacturing module 108, in one embodiment, includes one or more of an initialization module 302, a supplier module 304, an assembly module 306, a connection module 308, a validation module 310, and a data module 312, which are described in more detail below.

In one embodiment, the initialization module 302 is configured to provision, at a manufacturer 101, a sensor 102 by storing and authenticating identification data associated with the sensor 102. In one embodiment, the manufacturer 101 stores a unique device identifier for a sensor 102 on the computer readable storage media of the sensor 102, such as a media access control (MAC) address, an IP address, a globally unique identifier, or the like. The identification information can also include cryptographic information, such as a public key or a unique random number (e.g., a PAD) associated with the sensor 102. The initialization module 302 may make at least a portion of the identification data accessible by encoding the identification data in a QR code or an RFID tag associated with a sensor 102, as described in more detail below with reference to FIG. 4.

In one embodiment, the initialization module 302 digitally signs the identification information with the digital signature of the manufacturer 101. Each authorized manufacturer 101 of a device or sensor 102 may be assigned a digital certificate that verifies the identity of the manufacturer 101. The initialization module 302 uses a key pair associated with a manufacturer's 101 certificate to digitally sign the identification information, and then stores the digital signature and the corresponding digital certificate for the manufacturer 101 in the sensor 102 so that the data stored on the sensor 102 can be verified at a later point in the supply chain.

In some embodiments, the initialization module 302 stores one or more predetermined, trusted digital certificates in the sensors 102 that define which components the sensors 102 are allowed to communicate with at later points in the supply chain. For example, the initialization module 302 may store one or more digital certificates that correspond to one or more authorized suppliers 103 and final assemblers 105 such that the sensor 102 can verify that the entity that is attempting to communicate with it is a trusted entity based on verifying the digital certificate of the entity.

The supplier module 304, in one embodiment, is configured to facilitate in sending the sensors 102 from the manufacturer 101 to a supplier 103 that installs the sensors 102 in various subassembly units 104, such as by determining and identifying which suppliers 103 to send the sensors 102 to, determining the most cost-effective means to ship the sensors 102 to the suppliers 103, or the like. As described above, a subassembly unit 104 comprises an intermediate part or product in the supply chain that will be integrated into a larger product at some later point in the supply chain. In some embodiments, the supplier 103 installs the sensors 102 into different subassembly units 104 after the supplier module 304 verifies the identities of the sensors 102 and the authenticity of the identification data. In some embodiments, the validation module 310, described below, verifies the identities and the authenticity of the identification data.

In some embodiments, the supplier module 304 stores subassembly data in the sensors 102 in response to verifying the identity of the sensors 102 and the authenticity of the identification data using the identification process described below in reference to FIG. 4. The subassembly data, for example, may comprise location data that describes where a sensor 102 is located within a subassembly unit 104, supplier-specific data that identifies the supplier 103 (e.g., a supplier ID), or the like. In various embodiments, the supplier module 304 stores partial subassembly data on the sensor 102, meaning that the subassembly data can be aggregated or "built-up" as the subassembly unit 104 moves from one supplier 103 to another supplier 103 until it reaches the final assembler 105. In various embodiments, the supplier module 304 digitally signs the subassembly data using a digital signature applied by a supplier 103 so that the authenticity of the subassembly data can be verified at later points in the supply chain.

In one embodiment, the assembly module 306 is configured to facilitate in sending the subassembly units 104 from the supplier 103 to a final production area or final assembler 105 to be integrated into a larger unit or final product 106, such as by determining where to send the sensors 102 to, determining the most cost-effective means to ship the sensors 102 to the final assembler 105, or the like. In certain embodiments, the assembly module 306 verifies the identities of the sensors 102, at the final production area or final assembler 105, using the identification process described below in reference to FIG. 4, and verifies the authenticity of the data stored on the sensors 102 prior to, or after, installing the subassembly units 104 in the final product 106. The final product 106 may be configured with a network, such as a wireless sensor network (WSN), which allows the sensors 102 to communicate with a controlling device, such as a central server 206.

The connection module 308, in one embodiment, is configured to connect the sensors 102 to the WSN of the final product 106 in response to the authenticity of the identification data and/or the subassembly data being validated. In some embodiments, the connection module 308 connects a sensor 102 to an access point 202 of the WSN in response to the server 206 receiving the identification information for the sensor 102 and notifying the access point 202 of the new sensor 102. The connection module 308, in response to connecting a sensor 102 to the WSN, receives a symmetric key from the server 206 or the CA 204 that allows the server 206 or CA 204 to communicate with the sensor 102, control the sensor 102, access and/or store data on the sensor 102, or the like. The connection module 308 may store the symmetric key on the sensor 102 and/or at an access point 202 that the sensor 102 is connected to.

In one embodiment, the validation module 310 is configured to validate the identity of the sensors 102 and the authenticity of the identification data and/or the subassembly data stored in the sensors 102. In one embodiment, the validation module 310 verifies that the identification data has not be improperly altered by verifying the digital signature of the manufacturer 101 associated with the identification data, as is known in the art. Similarly, the validation module 310 verifies that the subassembly data has not be improperly altered by verifying the digital signature of the supplier 103 associated with the subassembly data. In one embodiment, the validation module 310 has access to the trusted certificates that it uses to validate digital signatures. For example, the validation module 310 may have access to a trust store comprising a plurality of verified trusted certificates, which may be located on the server 206 or the CA 204.

In certain embodiments, the validation module 310 verifies the identification data and/or the subassembly data at each point in the supply chain. In some embodiments, the validation module 310 only verifies the authenticity of the data stored in the sensors 102 by the most recent manufacturer 101 or supplier 103 in the supply chain. In this manner, the validation module 310, at the final production area 105, assumes that the authenticity of data has been verified at each step along the supply chain and only verifies the authenticity of the data added by the most recent supplier 103, by verifying the digital signature of the supplier 103, instead of verifying the signatures of each of the suppliers 103 and manufacturers 101 in the supply chain.

In some embodiments, the validation module 310 compares the signatures of the manufacturers 101 and the suppliers 103 against a data store of trusted signatures provided by the owner of the WSN, such as an airline. For example, an airline may maintain an airplane trust store of verified digital signatures. If the validation module 310 determines that a signature for a supplier 103 stored in the sensor 102 does not match a corresponding signature for the supplier 103 in the trust store, for example, the sensor 102 will not be connected to the WSN and/or may issue a warning, notification, signal, or the like to indicate that the authentication process failed.

The data module 312, in certain embodiments, is configured to receive at least a portion of the identification data associate with the sensors 102 from a quick-response (QR) code and/or a radio-frequency identifier (RFID) tag, as described in more detail below with reference to FIG. 4. In some embodiments, the data module 312 stores the identification information and/or the subassembly data associated with the sensors 102 in various access points 202 that the sensors 102 are connected to. In this manner, as described below with reference to the repair module 112, if a server 206 within the WSN fails, a new server 206 can be integrated into the WSN without having to query each sensor 102 in the WSN for its identification and/or subassembly data.

In some embodiments, the data module 312 sends final production data to the sensors 102 over the WSN. In one example embodiment, the data module 312 uses an extensible authentication protocol (EAP) comprising a tunneled posture transport (PT) to send the data to the sensors 102. In general, EAP is an authentication framework used for the transport and usage of keying material and parameters. Thus, the data module 312 can use or "hijack" PT-EAP for data transport, such as to send data to the sensors 102 from the server 206, to receive identification and/or subassembly data from the sensors 102, or the like.

Figure 4:
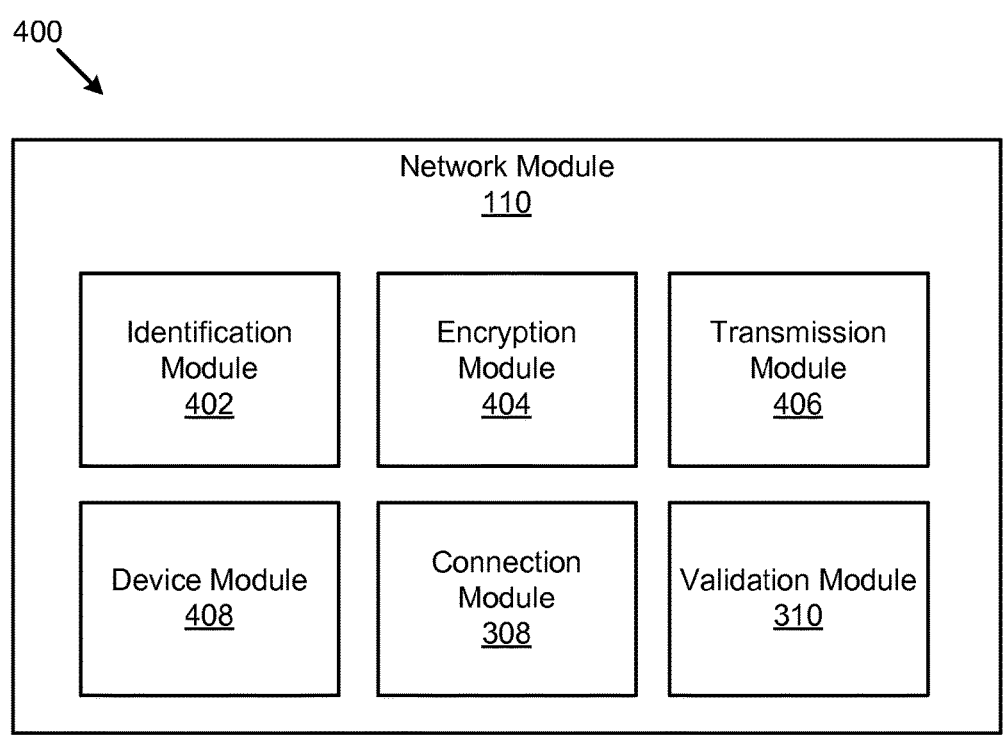
FIG. 4 is a schematic block diagram illustrating another embodiment of a module for secure provisioning of devices for manufacturing and maintenance.

FIG. 4 is a schematic block diagram illustrating another embodiment of a module 400 for secure provisioning of devices for manufacturing and maintenance. In one embodiment, the module 400 includes an embodiment of a network module 110. The network module 110, in certain embodiments, includes one or more of an identification module 402, an encryption module 404, a transmission module 406, and a device module 408, which are described in more detail below. The network module 110 may also include a connection module 308 and a validation module 310, which may be substantially similar to the connection module 308 and the validation module 310 described above with reference to FIG. 3.

In one embodiment, the identification module 402 is configured to receive identification data associated with a sensor 102 from a network maintenance device. For example, as described above, the identification data may be encoded in a QR code or an RFID tag. Accordingly, the network maintenance device may comprise a QR code reader or an RFID tag reader. In certain embodiments, the identification information comprises a MAC address, a public key of a public/private key pair, and/or a unique random number. In one embodiment, the network maintenance device sends the identification information to the identification module 402 over a first network, which may comprise an "out-of-band" network that is separate from the WSN, such as a secure Wi-Fi network, a Bluetooth® network, or the like. For example, the identification information may be sent by a maintenance device 203 over a secure wireless network 205, such as a WPA2 Authorized, IPv4, 802.11 network.

In one embodiment, the encryption module 404 is configured to generate a message and encrypt the message using at least a portion of the received identification data. For example, the encryption module 404 may generate a random Advanced Encryption Standard (AES) key and encrypt the key with the received public key and/or the unique random number/one-time PAD. In one example, the encryption module 404 encrypts the message by performing an exclusive-or (XOR) operation on the message and the portion of the identification data used to encrypt the message.

In one embodiment, the transmission module 406 is configured to send the encrypted message to the sensor 102 over a second network, such as the WSN. In response to the identification module 402 receiving the identification data, the server 206 may notify an access point 202 connected to the sensor 102 to allow the sensor 102 to access the WSN for a limited time, and/or in a limited capacity, such that the sensor 102 and the server 206 can verify the authenticity of each other. The server 206 can command the access point 202 to disconnect the sensor 102 from the WSN if there is an issue with the sensor's 102 identity or the data stored on the sensor 102. In this respect, the WSN is normally "closed" to sensors 102 attempting to join it. In some embodiments, the transmission module 406 is configured to send the encrypted message to a sensor 102 identified by the MAC address included in the identification data.

In one embodiment, the connection module 308 is configured to connect the sensor 102 to the second network, e.g., the WSN, in response to receiving a response to a challenge issued by the transmission module 406 located on the server 206. In some embodiments, the sensor 102 that receives the encrypted verification message from the transmission module 406 decrypts the message using the private key or the unique random number, and, if successful, sends an encrypted verification message to the connection module 308. For example, the encrypted verification message may comprise a random number that the sensor 102 hashes with its MAC address and sends to the connection module 308.

In response to receiving the verification encrypted message, the connection module 308 can verify that the sensor 102 successfully decrypted the encrypted message sent by the transmission module 406, and, therefore, can verify that the identity of the sensor 102. In this manner, the network module 110 can confirm that only authorized sensors 102, or other devices, are connecting to the WSN.

In one embodiment, after the sensor 102 has been identified and its data has been authenticated, the connection module 308 may send a symmetric key to the sensor 102, which can be used for secure communications between the sensor 102 and other devices in the WSN, such as the server 206. In another embodiment, the verification message comprises a shared key, such as an AES key, which the sensor 102 and server 206 can use for secure communications. If the sensor 102 is connected to a network at an intermediate step in the supply chain, such as at a supplier 103, the shared symmetric key, and other authentication data specific to the supplier 103, is removed when the sensor 102 is ready to be moved to the next step in the supply chain.

The device module 408, in one embodiment, is configured to maintain a list, database, table, or the like of authorized or allowed sensors 102 connected to the WSN. In certain embodiments, the device module 408 adds the sensor's 102 MAC address, or other unique identifier, to the table of allowed sensors 102 in response to the connection module 308 receiving the encrypted verification message from the sensor 102.

The validation module 310, as described above, is configured to verify the authenticity of the data stored on the sensors 102. The validation module 310 may verify a digital signature of a manufacturer 101 and/or a supplier 103 that stored data on the sensors 102. For example, the validation module 310 may confirm the authenticity of the identification data by verifying that the data has been digitally signed by the authorized manufacturer 101. Similarly, the validation module 310 may confirm the authenticity of the subassembly data by verifying that the data has been signed using the digital signature of the authorized supplier 103. In this manner, the validation module 310 ensures that the integrity of the data has not been corrupted, modified, or the like by an unauthorized entity.

Figure 5:
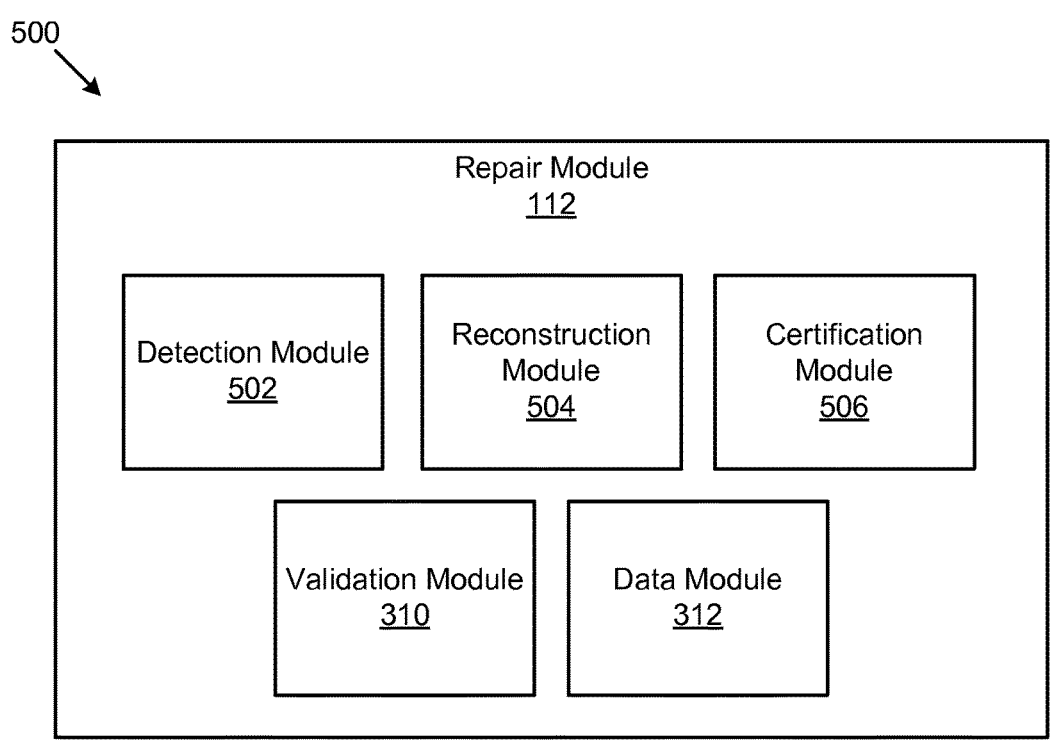
FIG. 5 is a schematic block diagram illustrating yet another embodiment of a module for secure provisioning of devices for manufacturing and maintenance.

FIG. 5 is a schematic block diagram illustrating yet another embodiment of a module 500 for secure provisioning of devices for manufacturing and maintenance. In one embodiment, the module 500 includes an embodiment of a repair module 112. The repair module 112 may include one or more of a detection module 502, a reconstruction module 504, and a certification module 506, which are described in more detail below. In a further embodiment, the repair module 112 also includes a validation module 310 and a data module 312, which may be substantially similar to the validation module 310 and the data module 312 described above.

The detection module 502, in one embodiment, is configured to detect a change in one or more devices of a secure WSN. In some embodiments, the change detected by the detection module 502 includes a change in one or more devices that breaks a chain of trust between the devices of the WSN. As used herein, a chain of trust in the WSN is generated by validating digital certificates of each component of the WSN, such as the sensors 102, the access points 202, the servers 206, and the CAs 204, to ensure that only trusted, authorized devices are used in the WSN.

In some embodiments, a changed device in the final product 106 may comprise a failure in a sensor 102, an access point 202, and/or a server 206; an existing CA 204 being replaced with a new CA 204; an issued digital certificate by the owner of the WSN being replaced with a new digital certificate; or the like. For example, where the WSN is located on an airplane, the detection module 502 may detect a failed sensor 102 in the WSN or a change in the certificate issued by the airline that owns the airplane, or the like.

In response to detecting the changed device, the data module 312 receives data from one or more unchanged devices of the WSN, which is used to reconstruct the chain of trust between the devices of the WSN. The data module 312 may receive the data over the WSN, for access point 202 and/or server 206 changes, or over an out-of-band network, such as a secure Wi-Fi, wired, or Bluetooth® network, for sensor 102 changes. The data that the data module 312 receives may include provisioning data, such as the MAC addresses of the devices on the network (e.g., the sensors 102 and the access points 202), public keys, or symmetric keys assigned to different devices on the WSN.

In certain embodiments, the data module 312 stores provisioning data, e.g. identification data and/or subassembly data (location data), on a plurality of access points 202 of the WSN. In certain embodiments, portions of a backup of the provisioning data is stored on a plurality of access points 202. In some embodiments, the data module 312 uses a secret sharing algorithm, such as Shamir's Secret Sharing, to store the provisioning data on the access points 202. As used herein, a secret sharing algorithm divides a secret (e.g., the provisioning data) into unique portions, which are distributed among different participants (e.g., the access points 202) such that at least a plurality of the parts are needed in order to reconstruct the secret. For example, the data module 312 may need to access portions of the data stored on three out of five access points 202 to reconstruct the data. In this manner, if an access point 202 fails, the provisioning data can still be reconstructed using the portions of the data stored on the different access points 202. Moreover, because not all the data is stored on a single access point 202, the provisioning data cannot be misappropriated if an access point 202 is replaced or otherwise removed from the WSN.

The reconstruction module 504, in response to the data module 312 receiving the data for reconstructing the chain of trust of the WSN, reconstructs the chain of trust between the devices of the WSN. For example, the reconstruction module 504 may receive a plurality of portions of a backup of provisioning data and may restore the backup to reconstruct the chain of trust. In certain embodiments, the reconstruction module 504 reconstructs the chain of trust of the WSN based on the type of device, certificate, ownership, or the like that has changed. For example, in one embodiment where a server 206 of the WSN fails, the sensors 102 and/or the access points 202 may request a new certificate from the new server that indicates the identity of the new server. In some embodiments, the sensors 102 and/or access points 202 of the WSN store a plurality of authorized or trusted certificates, which may have been stored on the sensors 102 and/or access points 202 by the CA 204, or another authorized entity associated with the owner of the WSN (e.g., an airline), and verifies that the new server's certificate corresponds to a trusted certificate. In this manner, the WSN can detect the change of, and can recover from, a new CA being installed in the WSN and a new CA certificate being issued by the new CA to the devices in the WSN.

In one embodiment, the certification module 506 is configured to issue, or reissue, certificates to maintain or reconstruct the chain of trust within the WSN. Thus, in some embodiments, if the identity of the new server is validated, the certification module 506 reissues certificates to the other devices of the WSN, e.g., the sensors 102 and access points 202 that correspond to the new server. In some embodiments, the certification module 506 receives a new certificate from the new server and compares the tail number (e.g., the last x number of characters of the certificate identifier that may correspond to the last x number of characters printed on a tail of an airplane, or another part of the final product 106) of the new certificate issued by the new server with the tail number of the existing certificate issued by the failed server 206. If the certification module 506 determines that the tail numbers are the same, the certification module 506 notifies the reconstruction module 504 that the new server is an authorized server for this WSN. In this manner, the certification module 506 avoids confusing the WSN with a nearby network that may have the same root of trust or parent CA, such as a CA for an airline.

The new server may then authenticate the sensors 102, using the identification data, e.g., PKI data (e.g., public/private key pair data) or a unique random number associated with the sensors 102, received from the sensors 102 or the access points 202. In various embodiments, the certification module 506 reissues the certificates to the sensors 102 and resynchronizes the trusted certificates on one or more access points 202. In some embodiments, the reconstruction module 504 reconstructs the table of authorized devices (e.g., the table comprising MAC addresses, keys, or unique identifiers for authorized devices within the WSN) based on identification data for the access points 202 and/or the sensors 102 that is stored in the access points 202.

Similarly, in another example, the detection module 502 may detect that the ownership of the WSN has changed, meaning that the owner of the WSN has issued a new certificate to the CA 204 and/or server 206, which breaks the existing chain of trust. In such an embodiment, the other devices of the WSN may not trust the CA 204 (or a parent CA of the CA 204) and/or the server 206 because the new certificate is different than the existing certificate stored on the sensors 102 or access points 202. In such an embodiment, the certification module 506 saves the existing (old) certificate/credentials (such as on the server 206, the access points 202, and/or the sensors 102).

The certification module 506 may then determine whether the devices of the WSN are using the existing certificate, and if so, the validation module 310 authenticates the devices with the existing certificate, because the initial authentication using the new certificate will fail, in order to communicate the new certificate to the devices. The certification module 506 reissues and sends the new certificates to the sensors 102 and access points 202. The reconstruction module 504, in some embodiments, updates the table of authorized devices stored on the server 206 (e.g., adds the new certificate information to the list of MAC addresses, keys, unique random numbers, etc. for each device of the WSN). After all devices have received the new certificate, the certification module 506 deletes the existing (old) certificate. In this manner, the chain of trust can be automatically reconstructed without any manual interaction from any users.

In some embodiments, if the detection module 502 determines that an access point 202 has failed and a new access point 202 has been installed in the WSN, the reconstruction module 504 may provision the new access point 202 using the process described above with reference to the network module 110 of FIG. 4. Namely, the server 206 may receive identification data from the access point 202 using the WSN or a secure out-of-band network (in situations where the access point 202 is a wireless access point or in a wired architecture where it cannot be determined which wire goes to a specific device), and the validation module 310 verifies the authenticity of the data. If successful, secret sharing data is restored to the access point 202, e.g., from the server 206 or other devices in the WSN, and any symmetric keys that are shared between the access point 202 and the sensors 102 connected to the access point 202 are refreshed. In a further embodiment, if the detection module 502 detects a new sensor 102 installed in the WSN, the network module 110 verifies the identity of the sensor 102 and the authenticity of the data of the sensor 102. If the network module 110 determines that the new sensor 102 is legitimate, then the network module 110 will connect the new sensor 102 to the WSN.

Figure 6:
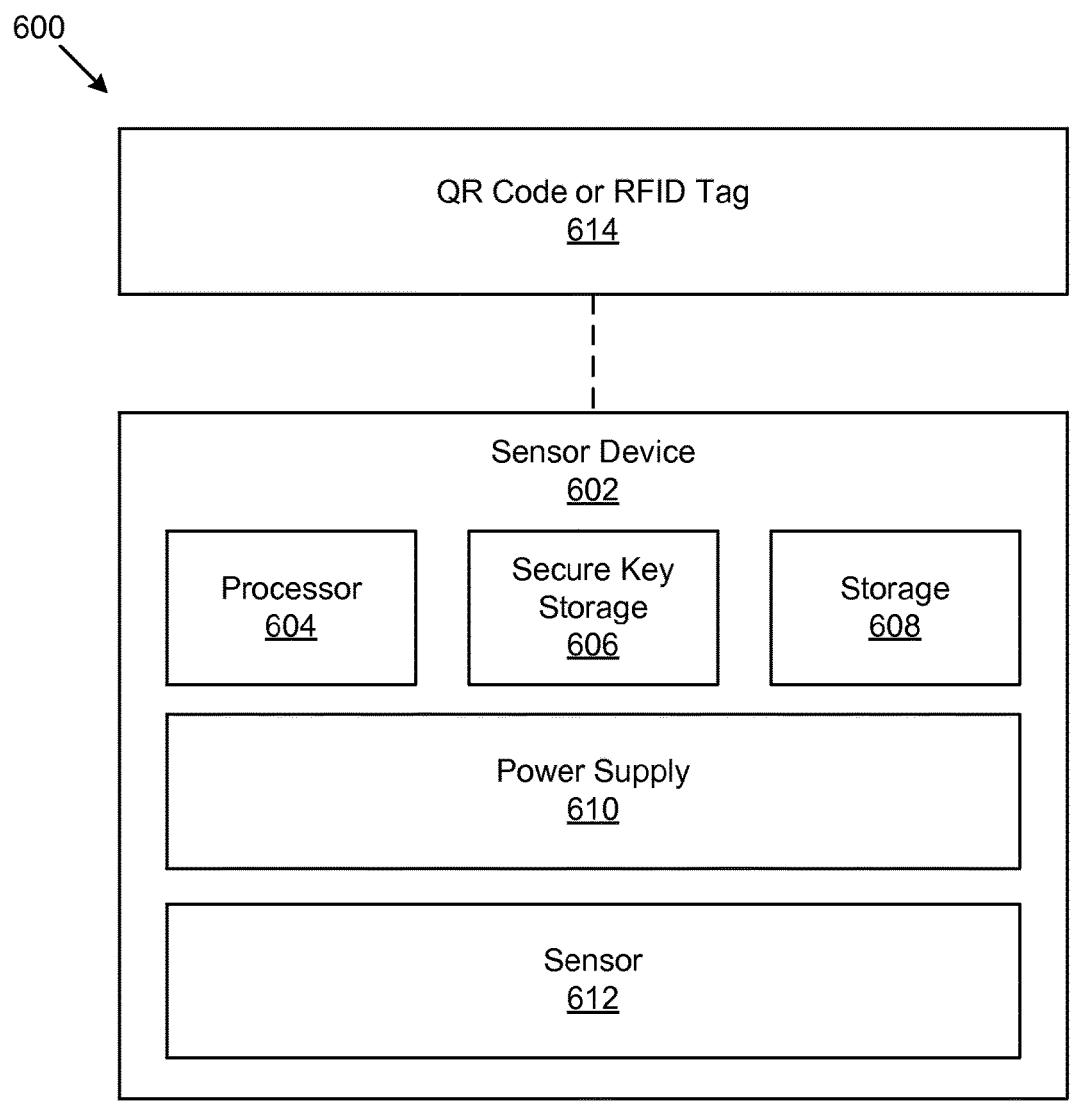
FIG. 6 is a schematic block diagram illustrating one embodiment of a sensor for secure provisioning of devices for manufacturing and maintenance.

FIG. 6 depicts one embodiment 600 of a sensor device 602 and a means (e.g., QR code or RFID tag 614) for accessing identification data stored on the sensor device 602. In one embodiment, the sensor device 602 is substantially similar to the sensors 102 described above, and includes a processor 604, a secure key storage 606, computer readable storage media 608, a power supply 610, and the sensor 612.

In one embodiment, the secure key storage 606 is configured to store identification data for the sensor device, such as a private key in a PKI configuration or a unique random number (e.g., a PAD). In some embodiments, the secure key storage 606 comprises a secure portion of the computer readable storage media 608 or a secure area of the processor that has been configured using a trusted platform module (TPM). Either way, the secure key storage 606 comprises a "tamper-proof" component of the sensor device 602 that is only accessible by physically destroying the sensor device 602. In some embodiments, the data stored on the sensor 102 in the secure key storage 606 is destroyed in response to any physical attempt to read the data.

The computer readable storage media 608, in some embodiments, stores additional identification data, such as a unique identifier for the sensor device 602 (e.g., a MAC address, an IP address, a globally unique identifier, or the like), the public key that corresponds to the private key stored in the secure key storage 606, or the like. Moreover, the computer readable storage media 608 may also store one or more digital certificates and/or digital signatures, such as the digital certificates/signatures for a manufacturer 101 or a supplier 103. Further, in various embodiments, the computer readable storage media 608 stores one or more predetermined, trusted digital certificates that correspond to authorized entities within the supply chain. For example, the manufacturer 101 of the sensor device 602 may store digital certificates for different suppliers 103 that the sensor device 602 is authorized to communicate.

In some embodiments, the identification data (e.g., public key, the unique random number for the sensor device 102, and/or the MAC address) is made accessible to external devices by encoding the identification data in a QR code or an RFID tag 614. In certain embodiments, the identification data is not accessible over the WSN in the clear. In this manner, a QR code reader or an RFID tag reader can read the identification information and send the identification information in a secure, out-of-band network to the server 206 of a WSN as the beginning of the process to connect the sensor device 602 to a WSN or other network.

In one embodiment, the power supply 610 may comprise a battery or an embedded form of energy harvesting, which allows the sensor device 602 to derive energy from external sources, such as solar power, kinetic energy, or the like. In a further embodiment, the sensor 612 is configured to monitor physical or environmental conditions, such as temperature, sound, pressure, etc.

Figure 7:
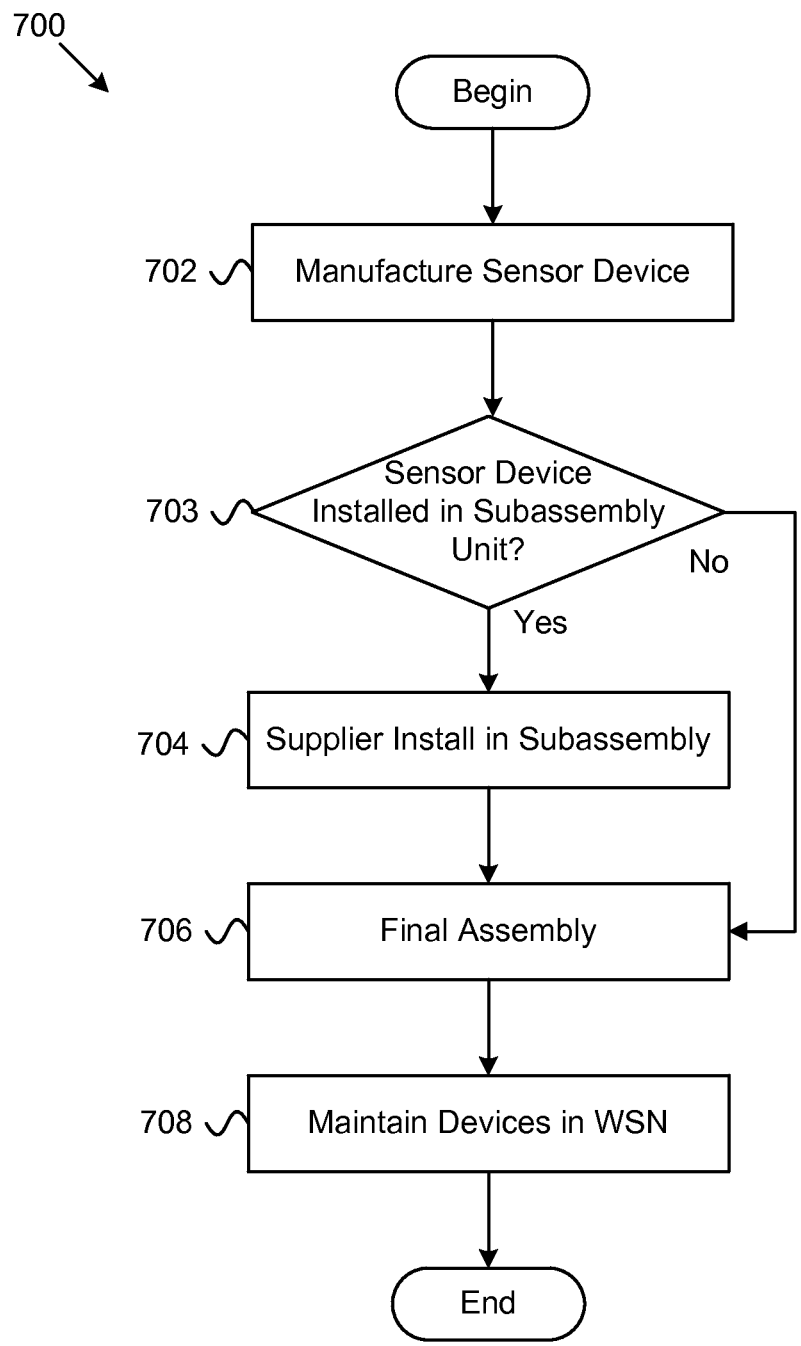
FIG. 7 is a schematic flow diagram illustrating one embodiment of a method for secure provisioning of devices for manufacturing and maintenance.

FIG. 7 is a schematic flow diagram illustrating one embodiment of a method 700 for secure provisioning of devices for manufacturing and maintenance. In one embodiment, the method 700 depicts the order of assembly within a supply chain. In one embodiment, the method 700 begins and a manufacturer 101 manufactures 702 a sensor 102 and initializes the sensor 102 with identification data, such as a MAC address, a public/private key pair, and/or a unique random number. The manufacturer 101 also encodes the identification information on a QR code or an RFID tag such that external devices can access the identification data.

In one embodiment, manufacturer 101 determines 703 whether the sensors 102 are to be installed in subassembly units 104. If so, in one embodiment, the sensors 102 are sent to one or more suppliers 103 that install 704 the sensors 102 into one or more subassembly units 104. The suppliers 103, in one embodiment, may also connect to the sensors 102 (using the provisioning process described above that comprises receiving identification data from a QR code/RFID tag and sending the identification data using an out-of-band network to authenticate the sensor 102) and store subassembly data on the sensors 102, such as sensor 102 location data. The subassembly units 104 are sent to a final assembler 105 that assembles 706 the subassembly units 104 into a final product 106.

If the manufacturer 101 determines 703 that the sensors 102 are not to be installed in subassembly unites 104, the manufacturer 101 sends the sensors 102 to the final assembler 105 to be assembled 706 into the final product 106. The sensors 102 may all be connected to a WSN, after being successfully identified and authenticated. The owner of the final product 106, such as an airline that owns an airplane, maintains 708 the chain of trust between the devices in the WSN in response to an event that breaks the chain of trust, such as a device failing, being misappropriated, or the like, and the method 700 ends.

Figure 8:
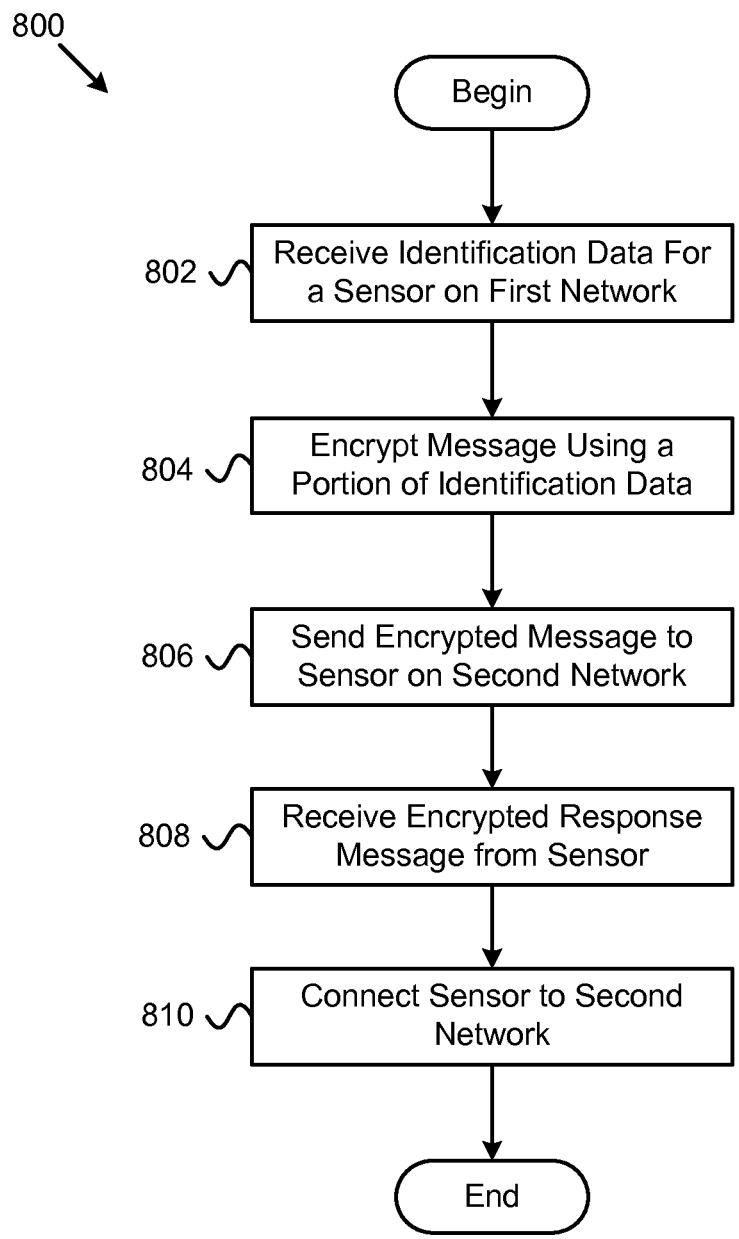
FIG. 8 is a schematic flow diagram illustrating another embodiment of a method for secure provisioning of devices for manufacturing and maintenance.

FIG. 8 is a schematic flow diagram illustrating another embodiment of a method 800 for secure provisioning of devices for manufacturing and maintenance. In one embodiment, the method 800 begins and an identification module 402 receives 802 identification data associated with a sensor 102 over a first network. The identification data may comprise a MAC address, a public key, a unique random number, or the like. The first network may comprise a secure out-of-band network 205, such as a secure Wi-Fi network. The identification data may be received from a secure network maintenance device 203 that receives the identification data from a QR code or an RFID tag.

In one embodiment, the encryption module 404 encrypts 804 a message using at least a portion of the received identification data, such as the unique random number, and the transmission module 406 sends 806 the encrypted message to the sensor 102 over a second network, which may comprise a WSN. The server 206, and/or the connection module 308, receives 808 an encrypted response message from the sensor 102.

The sensor 102, in one embodiment, responds to the encrypted message by decrypting the encrypted message using either a unique random number (e.g., the PAD) or the public key associated with the sensor 102. The sensor 102 may then re-encrypt the decrypted message using a portion of the identification data, such as the MAC address, for example, and sends the encrypted message back to the server 206. In another embodiment, the sensor 102 combines a portion of random data from the decrypted message with a portion of publicly-known data (such as a MAC address, a public key, or the like), encrypts the combined data, and sends the encrypted data to the server 206. In this manner, the sensor 102 verifies its identity by being able to decrypt the encrypted message using the identification data stored on the sensor 102 and send a response back to the server 206. The connection module 308 connects 810 the sensor 102 to the second network (e.g., the WSN) in response to receiving 808 the encrypted message from the sensor, and successfully decrypting the message, and the method 800 ends.

Figure 9:
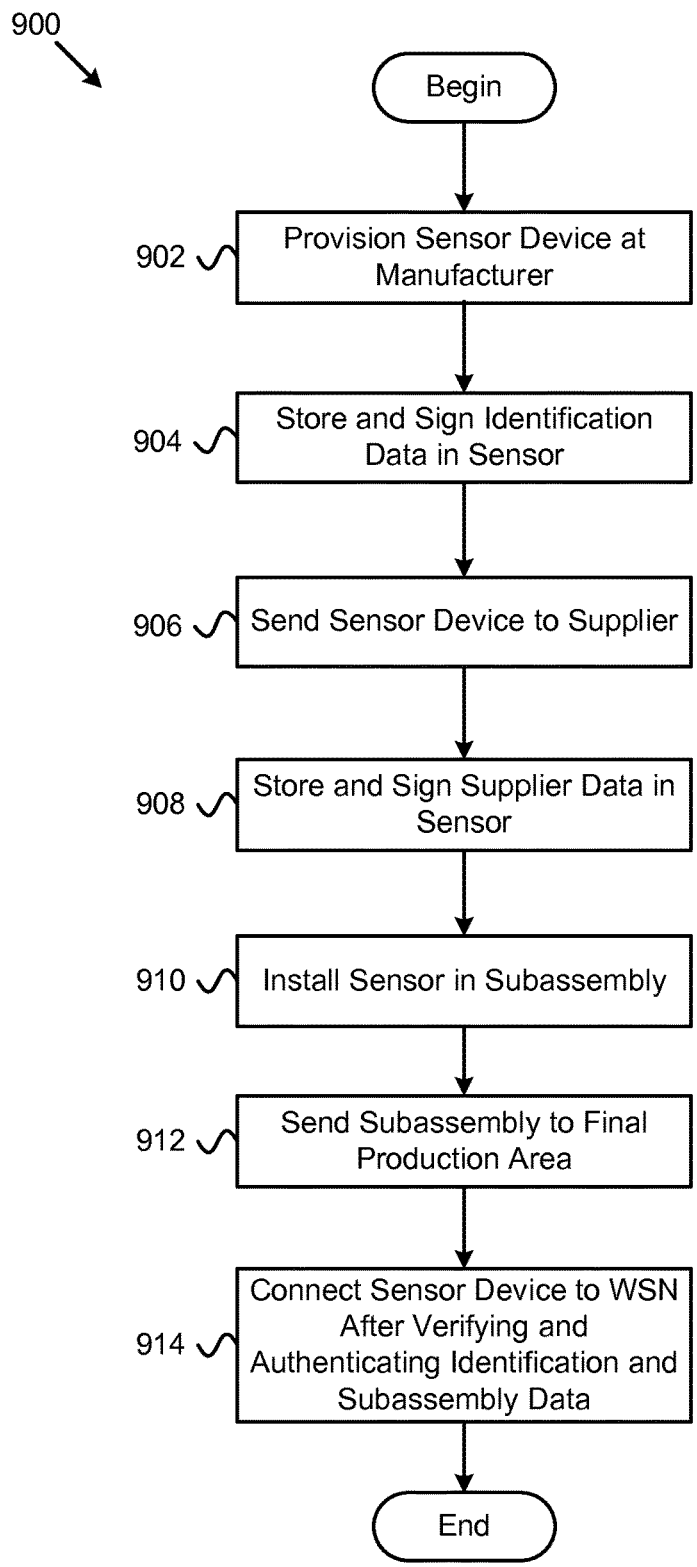
FIG. 9 is a schematic flow diagram illustrating yet another embodiment of a method for secure provisioning of devices for manufacturing and maintenance.

FIG. 9 is a schematic flow diagram illustrating yet another embodiment of a method 900 for secure provisioning of devices for manufacturing and maintenance. In one embodiment, the method 900 begins and an initialization module 302 provisions 902 a sensor 102 at a manufacturer 101. In one embodiment, the initialization module 302 stores 904 and digitally signs identification data for the sensor 102, such as a MAC address, a public/private key pair, and/or a unique random number, in the sensor 102.

In one embodiment, the supplier module 304 facilitates in sending 906 the sensors 102 to one or more suppliers 103 from the manufacturer 101. In some embodiments, the supplier module 304 connects to the sensors 102, using the process above with reference to FIG. 8, and stores 908 and digitally signs subassembly data, such as location data in the sensors 102 at a supplier 103. The suppliers 103 install 910 the sensors 102 into different subassembly units 104 that comprise different parts of a larger final product 106.

In one embodiment, the assembly module 306 facilitates in sending 912 the subassembly units 104 from a supplier 103 to a final assembler 105 that assembles the subassembly units 104 into a final product 106. The connection module 308 connects 914 the sensors 102 of the various subassembly units 104 to a WSN of the final product 106 in response to verifying the sensors 102 identities and the authenticity of the data stored on the sensors 102, and the method 900 ends.

Figure 10:
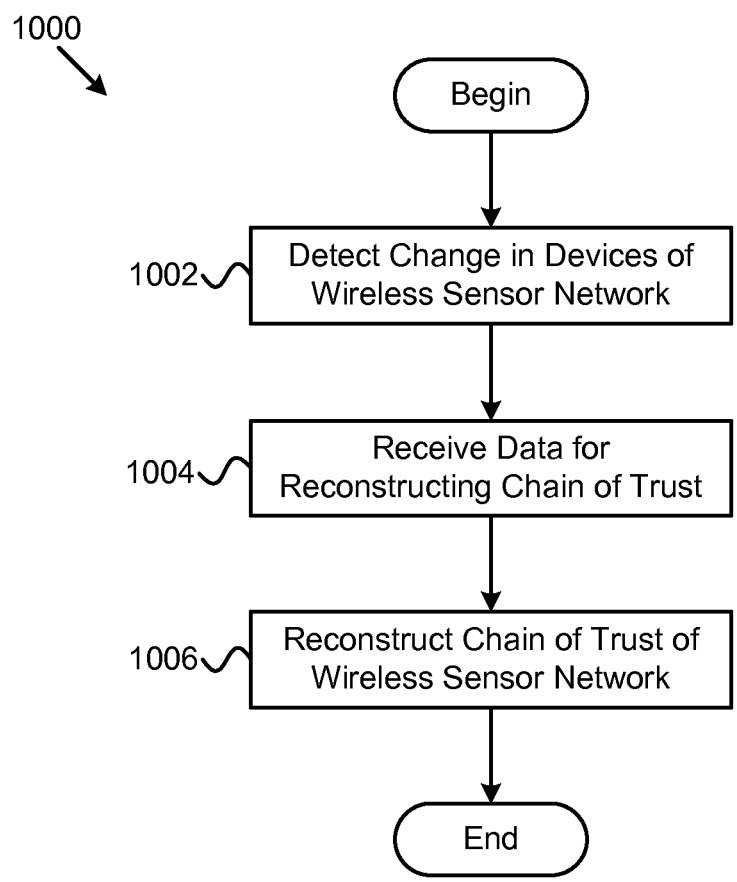
FIG. 10 is a schematic flow diagram illustrating an embodiment of another method for secure provisioning of devices for manufacturing and maintenance.

FIG. 10 is a schematic flow diagram illustrating an embodiment of another method 1000 for secure provisioning of devices for manufacturing and maintenance. In one embodiment, the method 1000 begins and the detection module 502 detects 1002 a change in one or more devices of the WSN, such as a device failure, a certificate change, an ownership change, or the like. The data module 312, in one embodiment, requests and/or receives 1004 data from one or more unchanged devices of the WSN, which is used to reconstruct a chain of trust between the devices of the WSN. The data may include certificates, identification data, subassembly data, or the like associated with different devices in the WSN. In a further embodiment, the reconstruction module 504 reconstructs 1006 the chain of trust between the devices of the WSN using the data received by the data module 312, and the method 1000 ends.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus forming part of a final product, comprising:
    an identification module configured to receive identification data associated with a sensor device, of a plurality of sensor devices secured to the final product, from a network maintenance device, external to the final product and configured to send the identification data over a first out-of-band network, external to the final product and disconnected from the plurality of sensor devices;
    an encryption module configured to encrypt a first message using at least a portion of the received identification data;
    a transmission module configured to send the encrypted first message to the sensor device of the plurality of sensor devices over a second network, forming part of the final product and configured to connect together the plurality of sensor devices; and
    a connection module configured to authorize a connection of the sensor device of the plurality of sensor devices to the second network in response to receiving an encrypted second message from the sensor device over the second network, the encrypted second message verifying the identity of the sensor device of the plurality of sensor devices.

2. The apparatus of claim 1, further comprising a validation module configured to authenticate data stored on the sensor device by verifying a digital signature of one or more of a manufacturer of the sensor device and a supplier of the sensor device.

3. The apparatus of claim 1, wherein the network maintenance device receives the identification data associated with the sensor device in response to reading a quick response (QR) code comprising the identification data.

4. The apparatus of claim 1, wherein the network maintenance device receives the identification data associated with the sensor device in response to reading a radio-frequency identifier (RFID) tag.

5. The apparatus of claim 1, wherein the second network comprises a wireless sensor network (WSN), the WSN comprising a plurality of sensor devices.

6. The apparatus of claim 1, wherein the identification data comprises a media access control (MAC) address and one or more of a public key and a random number.

7. The apparatus of claim 1, wherein the sensor device connects to the second network using a wireless networking protocol.

8. The apparatus of claim 1, wherein the encryption module encrypts the first message by performing an exclusive-or (XOR) operation on the message and the at least a portion of the identification data.

9. The apparatus of claim 1, wherein the message comprises a random advanced encryption standard (AES) key.

10. The apparatus of claim 1, wherein the transmission module sends the encrypted first message to a sensor device identified by a MAC address included in the identification data.

11. The apparatus of claim 1, further comprising a device module configured to maintain a table of allowable sensor devices of the second network, wherein a MAC address for the sensor device is added to the table of allowable sensor devices in response to the connection module receiving the encrypted second message from the sensor device.

12. The apparatus of claim 1, wherein the final product is a vehicle.

13. The apparatus of claim 12, wherein the vehicle is an aircraft.

* * * * *